United States Patent [19]
McClaran

[11] Patent Number: 4,712,596
[45] Date of Patent: Dec. 15, 1987

[54] LUMBER SURFACING MACHINE

[76] Inventor: Tom McClaran, 1042 Turndell Rd., La Habra, Calif. 90631

[21] Appl. No.: 11,311

[22] Filed: Feb. 5, 1987

[51] Int. Cl.$^4$ .............................................. B27C 9/00
[52] U.S. Cl. ................................ 144/3 R; 144/2 D; 144/123; 144/134 R; 144/361; 144/367; 83/811
[58] Field of Search ............. 144/2 R, 2 D, 1 R, 3 R, 144/41, 123, 134 R, 348, 361, 39, 367; 83/811, 813

[56] References Cited
U.S. PATENT DOCUMENTS 3,495,638  2/1970  Humphrey .................... 144/361
4,116,248  9/1978  Erwin ............................ 144/123

Primary Examiner—W. Donald Bray
Attorney, Agent, or Firm—Edgar W. Averill, Jr.

[57] ABSTRACT

A lumber surfacing machine for roughening the surface of at least one face of a length of lumber. The machine utilizes a driven band saw blade which is maintained by a pair of blade guides at an acute angle to the surface of the lumber to be roughened. Additional lumber surfacing blades comprising circular saws may be used in conjunction with the band saw blade. The circular saws are mounted at a small angle with respect to the surface which they are roughening.

18 Claims, 6 Drawing Figures

LUMBER SURFACING MACHINE

BACKGROUND OF THE INVENTION

The field of the invention is woodworking machinery and the invention relates more specifically to machinery for surfacing or roughening lumber to provide lumber with a rough sawn look. Rough sawn lumber has found widespread use in home building and office, hotel and restaurant construction to provide a warm, rustic appearance. Many years ago, such lumber was commonly used in remote areas where lumber sizing machinery was not available. The lumber directly from the first sawing operation was used before it was smoothed and sized into the standard lumber sizes. This look is often referred to as a "resawn look."

Plywood panels have been textured in this manner for many years and a machine for carrying out this surfacing operation is disclosed in the Kneisel U.S. Pat. No. 2,958,352. The Kneisel process utilizes a band saw blade which is maintained in a parallel relationship with respect to the plywood panel which is being surfaced. Chain saw blades have also been used for this purpose and one such device is shown in U.S. Pat. No. 3,561,509. A decorative laminated wood panel and the method of making the same is disclosed in U.S. Pat. No. 3,515,620. Circular saw blades are used to roughen the surface of lumber in a machine made by Idaco, but the surface of the lumber from this machine has semicircular grooves which do not duplicate the vertical grooves or scratches created by the original sawing operation. Another machine for roughening the surface is shown in U.S. Pat. No. 3,320,984, but this machine also has semicircular grooves and does not duplicate the rough sawn look.

Many lumber mills stock both rough sawn and smooth lumber but the added cost of increased inventory could be reduced if smooth lumber could be easily roughened. The mill would then have to stock only standard lumber sizes and could fill resawn lumber orders by merely roughening the surface of the standard lumber grades.

BRIEF DESCRIPTION OF THE DRAWINGS

FIG. 4 is an enlarged cross-sectional view of the blade guide and band saw blade of the lumber surfacing machine of FIG. 1.

FIG. 5 is a perspective view of a portion of a length of roughened lumber having been treated by the machine of FIG. 1.

FIG. 6 is a diagrammatic view of the support apparatus of the upper circular saw of the machine of FIG. 1.

DESCRIPTION OF THE PREFERRED EMBODIMENTS

Figure 1:
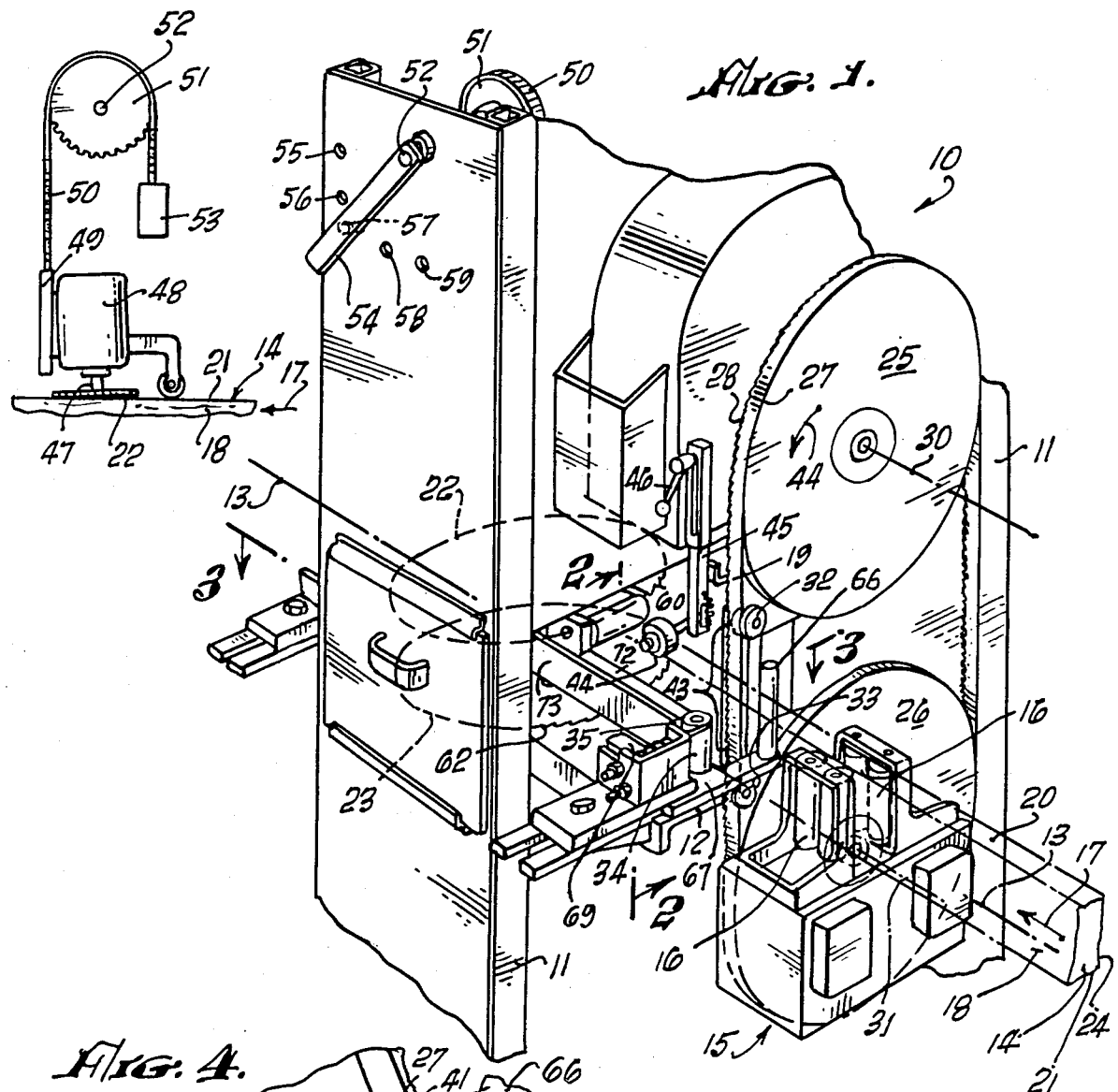
FIG. 1 is a perspective view of the lumber surfacing machine of the present invention.

A lumber surfacing machine is shown in FIG. 1 and indicated by reference character 10. Machine 10 has a frame 11 which supports a lumber-supporting bed 12 having a pair of lumber support rails 69 and 70. Lumber-supporting bed 12 has a longitudinal axis 13. A length of lumber 14 is shown in phantom view and this is fed into the machine by conventional lumber feeding means 15 which has driven rollers 16. The lumber moves in a direction indicated by arrow 17 and is held in an upright position so that its wide surface 18 is roughened by the band saw blade 19 in a manner described more fully below. The narrower surfaces, or edges, 20 and 21 may also be surfaced by a pair of circular saw blades 22 and 23. Since surfaces 20 and 21 are relatively narrow, the fact that the roughened lines are, in fact, arcuate is hidden because of the relative large diameter of the saw blades with respect to the width of the lumber.

The back 24 is not roughened unless a second pass is made. Typically, such lumber need, at most, have three sides roughened since the back side is typically hidden from view.

The support of band saw blade 19 comprises an important feature of the present invention. Band saw blade 19 is driven and guided by first saw wheel 25 and second saw wheel 26 in a conventional manner. Saw wheel 26 is a driven wheel and such wheels are commonly used in band saws. The blade 19, however, is mounted in a manner backwards with respect to conventional band saw blades. That is, the smooth side 27 is oriented toward the direction of the movement of the lumber and the cutting side 28, having teeth 29, is positioned away from the direction of lumber feed. The blade is also twisted with respect to the longitudinal axis 13 of the lumber-supporting bed along which the lumber is fed. The axis of rotation 30 of first saw wheel 25 is parallel to the longitudinal axis 13 of the lumber-supporting bed. Similarly, the axis of rotation 31 of the second saw wheel 26 is also parallel to the longitudinal axis 13 of the lumber-supporting bed. The blade guides, however, are maintained at an angle away from this longitudinal axis 13. More specifically, the first blade guide 32 and the second blade guide 33 are at an angle "a," as shown in FIG. 4, with respect to the longitudinal axis 13. Angle "a" must be an acute angle and, preferably, is between ten and forty-five degrees. As long as the blade is not parallel to the surface which it is roughening, and as long as it is not greater than ninety degrees, this angle is not particularly critical. The blade surface, however, can be used to guide the feeding lumber as indicated by the lumber shown in phantom lines in FIG. 4 and indicated by reference characters 14a, 14b, and 14c. If it is desired to guide the lumber in this manner, the angle "a" should be less than about forty-five degrees and ideally between ten and forty-five degrees.

The lumber is first guided by guide 66 which is held by a bracket 67 affixed to platform 12 by bolts 68. The lumber is also guided by opposing guide means 34 which comprises a roller 34a which is shown in more detail in FIG. 3. Roller 34 is rotatably held in a block 35 affixed to a shaft 36 held to frame 11. Block 35 is urged toward the lumber by a spring 37 in a conventional manner. An identical assembly holds the lumber against a feed roller 38 and the elements of the assembly are indicated by the same reference characters followed by a prime. A guide bracket 71 with a horizontal portion 72 and a vertical portion 73 guides the lumber along its movement through the machine.

Returning now to the blade guides, blade guide 33, as shown in FIG. 4, can be seen to have a flat, circular outer surface 39 against which band saw blade 19 rests. The outside diameter of the flat, circular outer surface is preferably about 2¾ inches and the width of the blade guides 32 and 33 is about 1 inch. The smooth side 27 of saw blade 19 rests against a blade-supporting ridge 40 along one edge of blade guide 33. This ridge edge is indicated by reference character 41 and the flat edge of blade guide 33 is indicated by reference character 42. It can also be seen that all the teeth 29 of band saw blade 19 are bent in the same direction. Typically, saw blades alternate in their direction of bend, but by bending the blades all in the same direction, the number of scratches on the surface of the lumber can be doubled. The combination of forces on blade 19 tends to hold it securely on the blade guides 32 and 33. As seen best in FIG. 4, the moving lumber will tend to pull the blade 19 away from blade-supporting ridge 40. However, the twist created by angle "a" tends to force the blade guide in the direction of blade-supporting ridge 40 and, thus, the blade stays securely in place in spite of the force caused by the movement of lumber against it. Band saw blade 19 has a cutting length 43 between first and second blade guides 32 and 33. The saw wheels turn in the direction of arrow 44 and, thus, the band saw blade is moving downwardly through the cutting length. This urges the length of lumber 14 against the lumber-supporting bed 12. The lumber is also held by opposing guide means 34 and an adjustable upper guide roller 44 further helps to hold the lumber in place. Roller 44 is held by a movable arm 45 which is secured in place by turning handle 46.

Figure 2:
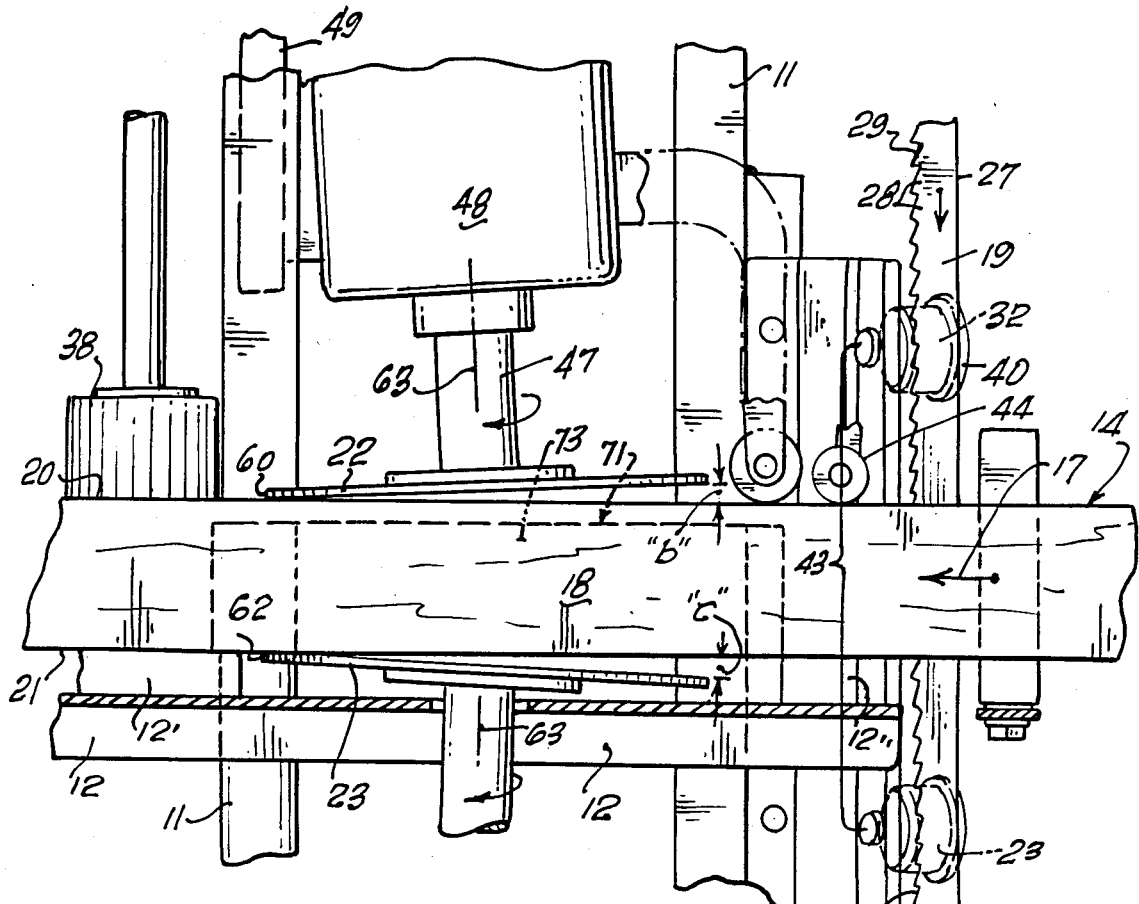
FIG. 2 is an enlarged view taken along line 2—2 of FIG. 1.
Figure 3:
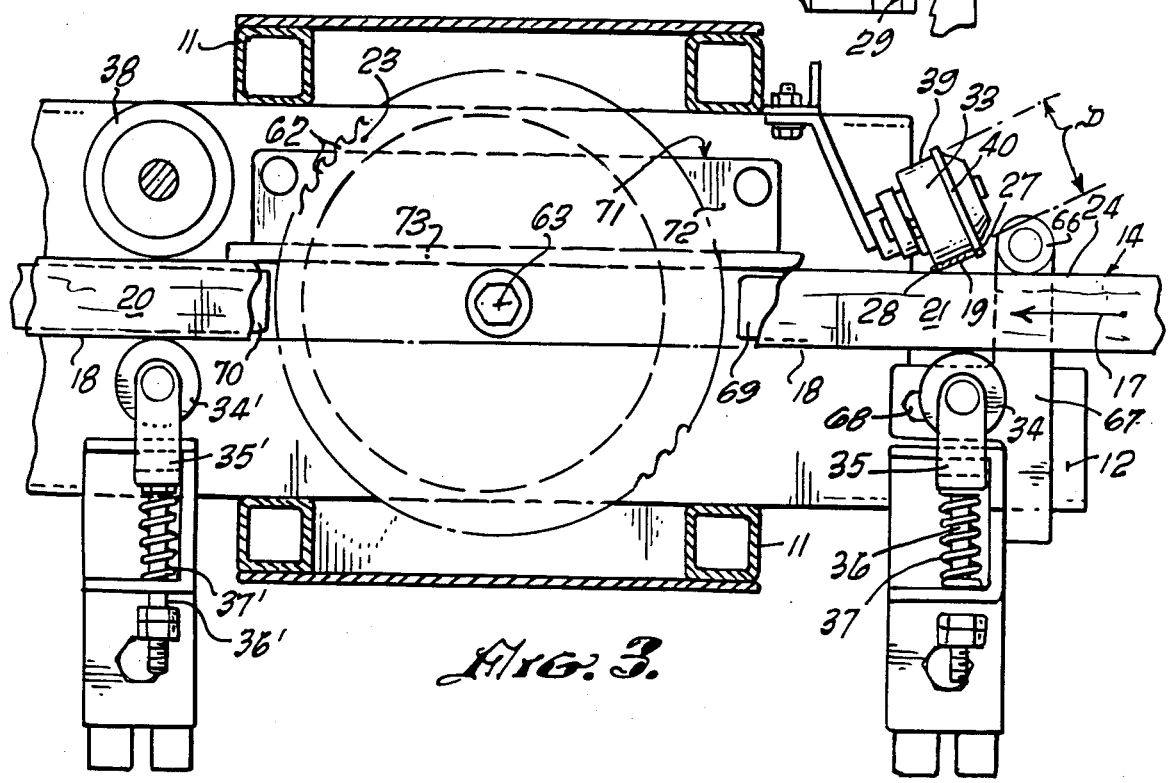
FIG. 3 is an enlarged view taken along line 3—3 of FIG. 1.

The machine of the present invention may also include means for roughening the narrow sides of the lumber and such means are shown in the machine of FIG. 1 utilizing circular saw blades 22 and 23. The action of these blades is shown most clearly in FIGS. 2 and 3 of the drawings where it can be seen that the upper circular saw blade 22 is held on a shaft 47 which is driven by a motor 48. Motor 48 is held on a trolley 49 which permits motor 48 to move up and down. As shown in FIG. 6, trolley 49 is held by chain 50 which, in turn, is supported by a sprocket 51 held on shaft 52. Chain 50 has a counterweight 53 which reduces the downward force of circular saw blade 22 and also facilitates the height adjustment of motor 48. This height adjustment is carried out by the movement of a handle 54 which has a pin (not shown) which fits in a plurality of holes 55, 56, 57, 58 and 59. These holes are formed so that the standard sizes of lumber can be easily surfaced. The surfacing is carried out by the teeth 60 on circular saw blade 22 and by teeth 62 on circular saw blade 23. Circular saw blade 22 is held at an angle indicated by reference character "b" in FIG. 2, and blade 23 is held at an angle "c" also indicated in FIG. 2. A small amount of play between the sprocket 51 and the shaft 52 allows the counterbalanced blade 22 to ride along the upper surface of the lumber. Angles "b" and "c" should be relatively small angles such as three degrees. As shown in FIG. 3, the workpiece, or length of lumber 14, should pass about over the center of rotation 63 of saw blades 22 and 23. In this way, the scratches on the top and bottom 20 and 21 of lumber 14 have only a very slight arc as indicated by circle 64 in FIG. 3 and are essentially straight to the casual observer.

Although the blade guides have been shown as wheels, other blade guide means could be used. For instance, Teflon blocks could be used or other low-friction means such as the air guide indicated in U.S. Pat. No. 2,958,352. It has been found, however, that the blade guide wheels are particularly effective, and wheels having a diameter at their smooth surface of about two inches are ideal although blade diameters as little as one inch or as much as six inches could be used. The blade diameter is indicated by reference character "D" in FIG. 3.

The machine of the present invention is capable of surfacing not only straight lumber but also lumber which has a slight distortion. It can be seen that the springs 37 and 37' allow guide wheels 34a and 34a' to move slightly and the upper motor 48, being counterbalanced by weight 53, also can move slightly upwardly if forced to do so by uneven lumber. Thus the machine will not jam even though distorted lumber is fed through it. The surface roughening caused by the machine of the present invention is very similar to that occurring on rough sawn lumber. Its use can greatly reduce the inventory of a lumber yard and the feeding speed of 50 feet to 150 feet per minute allows the rapid surfacing of lumber. The band saw of the present machine is driven at a slight reduction of conventional speed of six to seven thousand feet per minute. A tooth spacing of one tooth per inch and a feed speed of 100 feet per minute results in about 10 vertical scratches per inch which gives a very realistic surface pattern.

Although the twist in the blade as described above is the preferred embodiment, it is also within the purview of the present invention that saw wheels 25 and 26 be mounted so that the blade 19 is at an angle "a" with respect to the longitudinal axis 13. Also, in this configuration, the blade guides 32 and 33 would have their surfaces in line with the blade on saw wheels 25 and 26.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A lumber surfacing machine for roughening the surface of at least one face of a length of lumber, said machine comprising:

a frame including a lumber-supporting bed, said lumber-supporting bed having a longitudinal axis which is parallel to the direction in which lumber is moved along said bed and said frame being positionable adjacent lumber feeding means for feeding lumber to the machine;

a first saw wheel supported by said frame on one side of the lumber-supporting bed;

a second saw wheel supported by said frame on the opposite side of the lumber-supporting bed as the first saw wheel, at least one of said saw wheels being a driven wheel;

a band saw blade having teeth along a cutting side and having a smooth side, said blade being held around half of the first saw wheel and held around half of the second saw wheel;

first and second blade guides held by said frame, the first blade guide being on the same side of the lumber-supporting bed as the first saw wheel and the second blade guide being on the same side of the lumber-supporting bed as the second saw wheel, and each of the blade guides having a flat outer surface including a blade-supporting ridge extending above the flat outer surface so that the blade guides have a ridge edge and a flat edge, and the band saw blade being held against the flat outer surface so that its smooth side abuts each ridge, and each of said blade guides being parallel to one another and being supported so that an acute angle is formed between the flat surface and the longitudinal axis of the lumber-supporting bed, said acute angle having its apex at the smooth edge of the flat surface of either of the blade guides and said guides being positioned so that said band saw blade has a cutting length between the guides which is adjacent the lumber-supporting bed and perpendicular to the longitudinal axis of the bed; and opposing guide means held by said frame and said opposing guide means having a guide surface parallel to the cutting length so that lumber fed into the machine will have one surface held against the guide means and the opposite surface held against the teeth of the band saw and roughened by the teeth thereof.

2. The lumber surfacing machine of claim 1 wherein said cutting length is vertical and said lumber-supporting bed is generally horizontal.

3. The lumber surfacing machine of claim 1 wherein the axis of rotation of each saw wheel is parallel to the longitudinal axis of the lumber-supporting bed.

4. The lumber surfacing machine of claim 1 wherein said acute angle is between five and forty-five degrees.

5. The lumber surfacing machine of claim 1 wherein each of said blade guides are rotatable wheels.

6. The lumber surfacing machine of claim 5 where the smooth part of each blade guide has an outside diameter of between two and eight inches.

7. The lumber surfacing machine of claim 1 wherein all the teeth of said band saw are bent in the direction of the lumber to be surfaced.

8. The lumber surfacing machine of claim 2 wherein the band saw moves downwardly through the cutting surface and the blade is perpendicular to the lumber-supporting bed.

9. The lumber surfacing machine of claim 1 further including lumber roughening means for roughening a surface of the lumber adjacent the surface to be roughened by said band saw blade.

10. The lumber surfacing machine of claim 9 wherein said lumber roughening means is a circular saw blade mounted on said frame at an angle of between one degree and ten degrees with respect to the longitudinal axis of said lumber-supporting bed and the blade is mounted so that any unit of the lumber passing by said circular saw blade contacts the teeth of the blade after it has passed over the center of the blade.

11. The lumber surfacing machine of claim 10 wherein said lumber-supporting bed is about horizontal and said circular saw blade is mounted under said lumber-supporting bed.

12. The lumber surfacing machine of claim 10 wherein said lumber-supporting bed is about horizontal and said circular saw blade is mounted above said lumber-supporting bed.

13. The lumber surfacing machine of claim 11 further including a second circular saw blade mounted above said lumber-supporting bed, and said second circular saw blade being mounted on said frame at an angle of between one degree and ten degrees with respect to the longitudinal axis of said lumber-supporting bed, and the blade is mounted so that any unit of the lumber passing by said second circular saw blade contacts the teeth of the blade after it has passed over the center of the blade.

14. The lumber surfacing machine of claim 13 wherein said second circular saw blade is movably mounted so that it can move upwardly slightly if forced to do so by the lumber passing under said second saw blade.

15. A lumber surfacing machine for roughening the surface of at least one face of a length of lumber, said machine comprising:

a frame including a generally horizontal lumber-supporting bed, said lumber-supporting bed having a longitudinal axis which is parallel to the direction in which lumber is moved along said bed and said frame being positionable adjacent lumber feeding means for feeding lumber to the machine;

a lower circular saw blade mounted on said frame at an angle of between one degree and ten degrees with respect to the longitudinal axis of said lumber-supporting bed and the blade is mounted so that any unit of the lumber passing by said circular saw blade contacts the teeth of the blade after it has passed over the center of the blade, said lower circular saw blade being positioned so that its teeth extend only slightly above the surface of the lumber-supporting bed; and an upper circular saw blade mounted on said frame at an angle of between one degree and ten degrees with respect to the longitudinal axis of said lumber-supporting bed and the blade is mounted so that any unit of the lumber passing by said circular saw blade contacts the teeth of the blade after it has passed under the center of the blade and said upper circular blade being movably mounted on a vertically movable trolley, said trolley being supported by chain means.

16. The lumber surfacing machine of claim 15 wherein said upper circular saw blade is vertically adjustable.

17. The lumber surfacing machine of claim 16 wherein the chain means passes over sprocket means and a counterweight is affixed to the chain means on the opposite side of said sprocket as said circular saw, and the height of the upper circular saw is adjusted by turning said sprocket means.

18. A lumber surfacing machine for roughening the surface of at least one face of a length of lumber, said machine comprising:

a frame including a generally horizontal lumber-supporting bed, said lumber-supporting bed having a longitudinal axis which is parallel to the direction in which lumber is moved along said bed and said frame being positionable adjacent lumber feeding means for feeding lumber to the machine;

an upper saw wheel supported by said frame above the lumber-supporting bed;

a lower saw wheel supported by said frame below the lumber-supporting bed, at least one of said saw wheels being a driven wheel and both of said saw wheels having an axis of rotation which is parallel to the longitudinal axis of the lumber-supporting bed;

a band saw blade having teeth along its cutting side and having a smooth side, said blade being held over the top half of the upper saw wheel and held around the lower half of the lower saw wheel;

upper and lower blade guides held by said frame, the upper blade guide being above the lumber-supporting bed and the lower blade guide being below the lumber-supporting bed and each of the blade guides having a flat outer surface including a blade-supporting ridge extending above the flat outer surface so that the blade guides have a ridge edge and a flat edge and the band saw blade being held against the flat outer surface so that its smooth said abuts each ridge and each of said blade guides being parallel to one another and being supported so that an acute angle is formed between the flat surface and the longitudinal axis of the lumber-supporting bed, said acute angle having its apex at the smooth edge of the flat surface and said guides being positioned so that said band saw blade has a cutting length between the guides which is adjacent the lumber-supporting bed and perpendicular to the longitudinal axis of the bed; and opposing guide means held by said frame and said opposing guide means having a guide surface parallel to the cutting length so that lumber fed into the machine will have one surface held against the guide means and the opposite surface held against the teeth of the band saw and roughened by the teeth thereof.

* * * * *